Dec. 2, 1924.  
O. S. WIBLE  
1,517,931  
DEVICE FOR PUNCTURING CELLS OF CITROUS FRUITS  
Filed Jan. 9, 1924
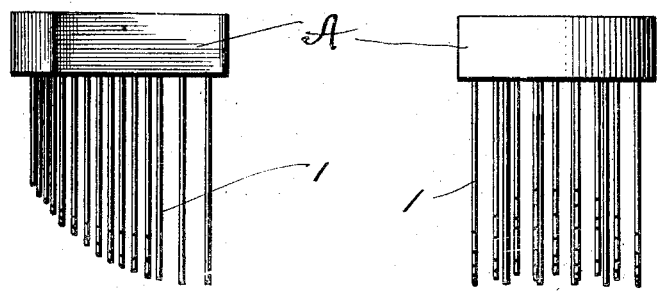
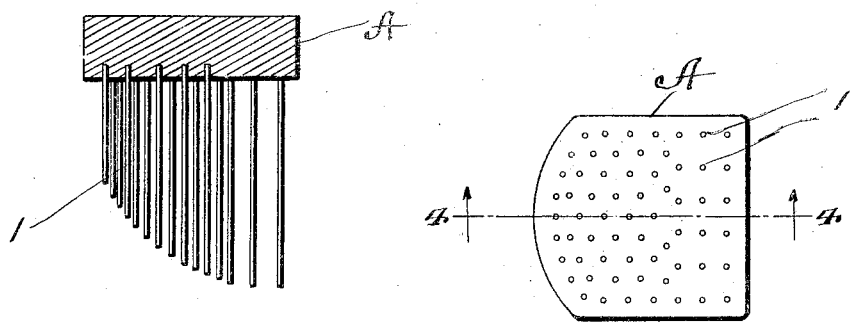

Patented Dec. 2, 1924.

1,517,931

UNITED STATES PATENT OFFICE.

OMER S. WIBLE, OF INDEPENDENCE, KANSAS.

DEVICE FOR PUNCTURING CELLS OF CITROUS FRUITS.

Application filed January 9, 1924. Serial No. 685,221.

*To all whom it may concern:*

Be it known that I, OMER S. WIBLE, a citizen of the United States, residing at Independence, in the county of Montgomery and State of Kansas, have invented certain new and useful Improvements in Devices for Puncturing Cells of Citrous Fruits, of which the following is a specification.

My invention relates to an improvement in device for puncturing cells of citrous fruits.

The primary object is to open or puncture the small juice cells or bags, of which the fruit such as oranges, grape-fruit or lemons is composed, to the end that more of the juice is liberated and obtainable. Furthermore, it makes any preparation for eating such as cutting, trimming, etc., unnecessary.

Another important point is the prevention of the annoyance of the squirting of the juices commonly experienced when eating grape-fruit and oranges, due to the sudden breaking of the cells.

The invention consists of a back or base, and a plurality of fine steel teeth of varying lengths held in the back or base.

In the accompanying drawings:

Fig. 1 is a view in side elevation;
Fig. 2 is a rear view;
Fig. 3 is a plan view; and
Fig. 4 is a section on the line 4—4 looking in the direction of the arrow.

A is the back or base which may be made of wood, hard rubber or any equivalent material and 1 indicates the puncturing pins or teeth. These are preferably made of steel and a large number of them are employed and they vary in length as viewed in Figures 1 and 4 and in such a manner as to conform more or less to the rounded shape of the interior of the fruit upon which the device is used.

By a device of this character, a grape-fruit, orange or lemon is quickly prepared for serving either at the table or in the extracting of the juice for lemonade, bottling or other purposes.

These pins or teeth are calculated to reach and puncture every cell or sac, thus liberating the juice without causing it to squirt in all directions. It furthermore prepares the fruit for squeezing out the juice should it be desirable to do so.

It may be necessary to press the teeth into the fruit several times in order to reach all of the cells or sacs. When it is used it is understood the fruit is first cut open and the piercing is done from the open side.

I claim:

A device of the character described including a back or base and a plurality of teeth or pins secured therein, these teeth or pins being of varying length and piercing a curvature at their ends adapted to conform substantially to the curvature of the interior section of the half fruit.

In testimony whereof I affix my signature.

OMER S. WIBLE.